United States Patent [19]

Schiff

[11] Patent Number: 4,639,932
[45] Date of Patent: Jan. 27, 1987

[54] CLOCK RATE SPREAD SPECTRUM

[75] Inventor: Leonard N. Schiff, Mercer County, N.J.

[73] Assignee: RCA Corporation, Princeton, N.J.

[21] Appl. No.: 770,561

[22] Filed: Aug. 29, 1985

[51] Int. Cl.$^4$ ............................................... H04K 1/02
[52] U.S. Cl. ......................................... 375/1; 329/50; 455/29
[58] Field of Search .............. 179/1.5 R, 1.5 S, 1.5 E, 179/1.5 M, 1.5 FS; 178/22.01, 22.13, 22.14, 22.17; 455/26, 29, 30; 375/1, 2.2, 97; 329/50, 122, 124

[56] References Cited

U.S. PATENT DOCUMENTS

| | | | |
|---|---|---|---|
| 4,206,462 | 6/1980 | Rabow et al. | 455/30 |
| 4,214,209 | 7/1980 | Baier et al. | 375/1 |
| 4,231,113 | 10/1980 | Blasbalg | 455/29 |
| 4,319,358 | 3/1982 | Sepp | 375/1 |
| 4,351,064 | 9/1982 | Ewanus | 455/29 |
| 4,358,857 | 11/1982 | Gleason et al. | 455/30 |

OTHER PUBLICATIONS

"Spread Spectrum Systems", Robert C. Dixon, 2nd Edition, 1984, pp. 136-141.

Primary Examiner—Benedict V. Safourek
Attorney, Agent, or Firm—Joseph S. Tripoli; Robert L. Troike; William H. Meise

[57] ABSTRACT

A transmitter and receiver for direct sequence spread-spectrum (SS) communications is described. The audio or other analog information to be communicated controls the clock rate of a pseudorandom sequence (PRS) to produce clock rate encoded direct sequence spread spectrum signals. The signals are decoded by a feedback loop including a voltage controlled oscillator which clocks a local PRS generator. A phase detector responds to the clock rate encoded received PRS signal and to the local PRS signal to produce a control signal. The control signal is filtered and applied to the VCO to control the local PRS clock rate. The decoder loop forces the VCO rate to track the clock rate of the encoded signal, and the decoder loop VCO control signal reproduces the analog information. A demodulator for a clock rate encoded SS signal upconverted by a carrier includes a pair of mixers, a first of which receives the signal to be demodulated and the local PRS sequence from the decoder. When the local and received sequence are phase coincident, the first mixer produces the carrier. The second mixer receives the signal to be demodulated and the carrier from the first mixer and generates therefrom demodulated baseband clock rate encoded SS signals for application to the decoder.

10 Claims, 7 Drawing Figures

CLOCK RATE SPREAD SPECTRUM

This invention relates to a spread spectrum communication system and more particularly to a direct sequence spread spectrum system in which the clock rate is varied in response to the information to be transmitted.

BACKGROUND OF THE INVENTION

Spread spectrum (SS) communications systems communicate information by encoding it with a pseudorandom (PR) sequence in such a manner that the frequency bandwidth of the encoded signal is spread. In this respect, spread spectrum communication is similar to wideband frequency modulation. A broadband frequency modulation communication system has the advantage that increasing the system bandwidth at constant transmitted power density increases the signal-to-noise ratio of the received signal. When encoded, the transmitted power of a spread spectrum signal is spread over a relatively large bandwidth and therefore the power spectral density is low, so that the signal power is low relative to the noise in a given bandwidth. Spread-spectrum communication differs from frequency modulation communication in that the SS signal power density is comparable to the ambient noise density. This attribute of SS communications makes it possible to "re-use" a portion of the electromagnetic frequency spectrum being used by other communication services. For example, a spread-spectrum communication system having a transmitted power comparable to the noise in a bandwidth may coexist with a television transmission system using the same bandwidth without affecting the television communication. This is termed an "overlay" mode of operation.

The spread spectrum receiver associated with the low power density SS transmission can receive the SS signal because it uses correlation with a locally generated pseudorandom sequence corresponding to the encoding sequence to "de-spread" the SS signal to a much smaller bandwidth, in which the signal-to-noise ratio (SNR) can be relatively high. In conjunction with the de-spreading of the signal bandwidth by means of the local pseudorandom sequence, the fixed frequency signals of the other communication services with which the spread spectrum system coexists in the overlay mode of operation (overlay service) are, in turn, despread to a wide bandwidth. This reduces the power density of the potentially interfering signals, so that only a small amount of power attributable to the potentially interfering signal exists in the narrow IF or baseband bandwidth of the spread spectrum receiver. The small amount of interfering power does not materially affect the received SS signal.

It is well known that spread spectrum transmissions can be overlayed on one another by the use of code division multiple access (CDMA). In the CDMA mode, each transmitter and receiver of a set of transmitters and receivers processing the same information uses a single pseudorandom sequence for encoding and decoding the transmissions. Other sets of transmitters and receivers processing other information encode and decode with different PR sequences.

Public safety officials such as fire and police officers often require lightweight, portable, low power "walkie-talkie" communication transceivers (transmitter-receiver combinations) for communication (transmission and reception) of analog information such as audio signals. Frequency modulation is frequently used for such walkie-talkie service. As mentioned, frequency modulation spreads the spectrum of the audio signal and may reduce noise by comparison with amplitude modulation communication. An advantage of frequency modulation over amplitude modulation is that the amplitude of the received and processed audio signal depends upon the frequency of received signal and not upon its amplitude. Consequently, the volume of the audio signal does not vary in dependence upon the locations of the transmitters and receivers, so long as a usable signal is received.

The Federal Communications Commission has authorized limited use of spread spectrum transmissions by public safety agencies and by the general public. One of the cheapest, simplest and lowest-power spread spectrum encoding schemes is direct sequence encoding in which the spreading waveform is a pseudorandom digital bit sequence. The pseudorandom sequence can be used to spread either the analog or audio signal itself or a digitized version of the analog signal. Using inexpensive pseudorandom chip generators capable of clock or chip rates of three or four Megachips per second (M chips/sec) to spread the analog audio signal, and assuming that an audio bandwidth of three KHz is adequate for most uses, an effective spread spectrum system having a spreading gain of greater than 1000 is possible. Spreading gain is the ratio of SS modulated bandwidth to information signal bandwidth. A spreading gain in the vicinity of 1000 provides substantial immunity from interference by the services sharing the common bandwidth in overlay service and reduces interference by the spread spectrum signal on the co-users. The overlay capability of a spread-spectrum communication system is particularly advantageous for public safety officials, who may be required to communicate with each other at the scene of a disaster which may be near any of a multitude of diverse interfering services. A particular disaster may be near a mobile radio base station producing substantial power, for example, at 49 MHz, while another may be near an antenna farm having several television and FM broadcast stations ranging in frequency from 54 to 800 MHz. However, a conventional direct sequence SS system in which a direct sequence spreads or modulates a baseband audio signal has a disadvantage by comparison with ordinary frequency modulation in that the volume of the received signal changes in response to the received power, as in amplitude modulation. This occurs because the magnitude of the received signal may change with distance and with changes in the positions of the transmitters and receivers relative to interfering objects such as buildings. The communication may also be adversely affected by rapid changes in received signal power (flutter) caused by rapidly moving vehicular traffic in the area.

Direct sequence spreading of a digitized (pulse code modulated) audio waveform is also possible. When an audio signal is digitized it is quantized both in time (sampling) and in amplitude. In theory, it is only necessary to sample the signal at a frequency which is twice the highest audio frequency component to be transmitted. However, in actual practice the standard sampling frequency is 8 KHz for a 3 KHz audio channel. Furthermore, an audio signal must be amplitude quantized to about 130 to 250 levels (7 or 8 bits) to provide a natural sounding communication. Thus, 7 or 8 bits must be transmitted during each sampling interval. The bit rate for audio transmission, then, must be (8 KHz)×(8), which equals more than 64 Kbits/sec if bandwidth compression techniques are not used. Even using bandwidth compression techniques such as delta modulation, the least practical transmission rate must be in the range of 32 Kbits/second to achieve both low cost and natural speech sound. Considering that the bit rate of the PRS generator is in the range of 3 Mchips/sec, the spreading gain is $$3 \times 10^6 \text{ chips/sec}/3.2 \times 10^4 \text{ bits/sec} \approx 100$$

Such a low spreading gain may result in interference by the spread spectrum system on the service using the bandwidth on which it is overlayed, and similarly the service may interfere with the spread spectrum system.

A simple communications system adapted for audio or other analog communication in an overlay mode is desired, which is capable of high spreading gain for reduced interference among co-users of the spectrum.

SUMMARY OF THE INVENTION

A method for spread spectrum modulation of analog information includes the steps of generating a clock signal and applying the clock signal to a pseudorandom signal generator for generating a spread spectrum signal. The rate of the clock signal is controlled by the analog information to generate a variable rate spread spectrum signal. A demodulator for a direct sequence spread spectrum signal so encoded includes a controllable oscillator for generating variable rate clock signals and a local pseudorandom sequence generator coupled to the oscillator for being clocked thereby to produce a local rate-variable pseudorandom sequence. A phase detector receives the spread spectrum signal and the local pseudorandom sequence and generates a control signal representative of the phase angle therebetween. The control signal is applied to a loop filter to generate a filtered control signal which is applied to the rate controlled oscillator for closing a degenerative feedback loop for maintaining the first and local pseudorandom sequences in phase coherence. The filtered control signal then manifests the analog information. An information use device is coupled to the loop filter for receiving the filtered control signal for using the analog information contained therein.

DESCRIPTION OF THE INVENTION

Figure 1:
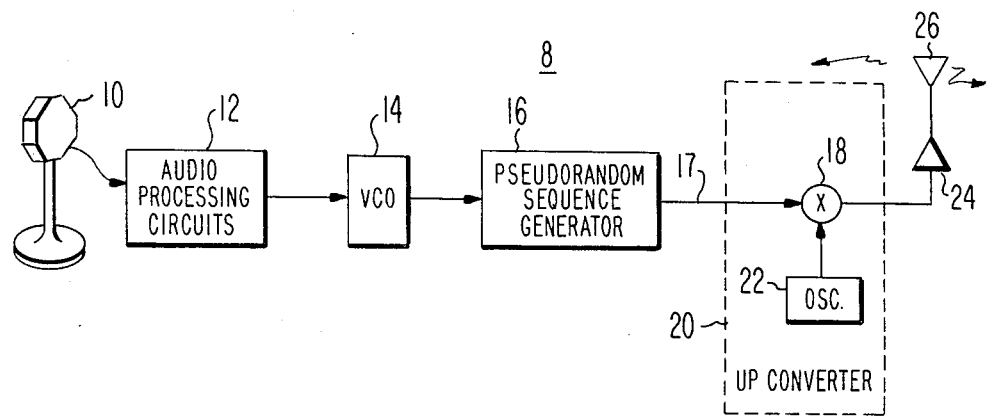
FIG. 1 is a block diagram of an apparatus including a modulator/and a transmitter according to the invention.

FIG. 1 illustrates as 8 a modulator and transmitter ("transmitter") according to the invention. In FIG. 1, a microphone illustrated as 10 couples audio signals to amplifiers or other audio processing circuits illustrated as a block 12 which process the signals and apply them to a voltage controlled oscillator (VCO) 14 which produces clock (chips) signals at a frequency which is modulated by the amplitude of the audio signal applied thereto. Frequency modulated or controlled clock signals are applied from VCO 14 to a pseudorandom sequence generator 16 which recurrently generates on conductor 17 a predetermined pseudorandom sequence. Clock rate modulated spread spectrum signals are applied from conductor 17 to an input terminal of a multiplier 18 of a frequency upconverter 20. A second input terminal of multiplier 18 receives signals from an oscillator 22 for upconverting the spread spectrum signals produced by pseudorandom sequence generator 16. The upconverted signals are applied to the input of an amplifier illustrated as 24, and amplified signals are applied to an antenna 26 for broadcasting the spread spectrum signals in the form of electromagnetic radiation.

Transmitter 8 of FIG. 1 modulates the clock rate of VCO 14 in accordance with the instantaneous amplitude of the audio signal, which is the information to be transmitted. The information is thus encoded as variations in the clock or chip rate of the spreading generator. In effect, pseudorandom sequence (PRS) generator 16 produces a broadband spectrum at a clocking rate which is variable. As mentioned above, inexpensive PRS generators at the current state of the art are capable of being clocked at a few Mbits per second, creating a pseudonoise spectrum a few MHz wide.

Figure 2:
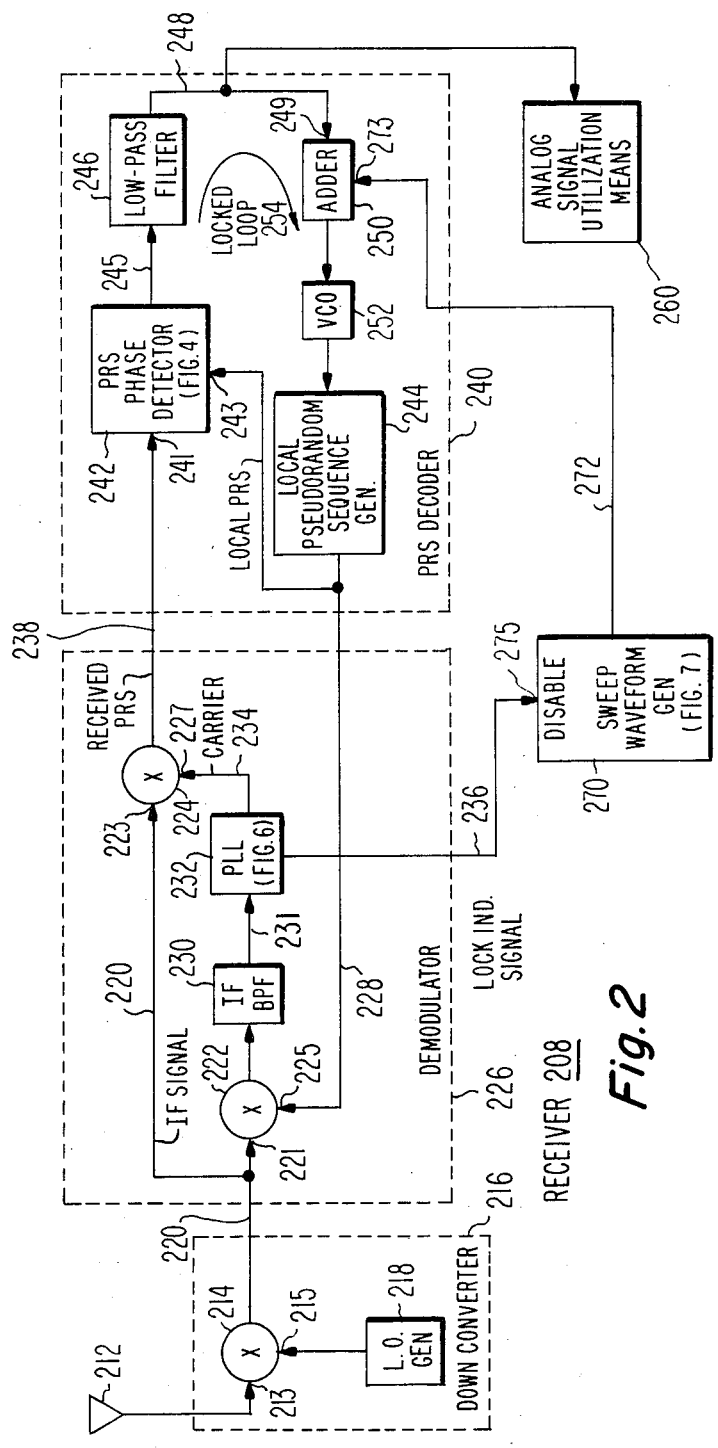
FIG. 2 illustrates an apparatus including a receiver and a demodulator for receiving the signals from the arrangement of FIG. 1.

FIG. 2 is a block diagram of a receiver 208 for signals modulated according to the method described in conjunction with FIG. 1. In FIG. 2, an antenna 12 receives the signals from the transmitter of FIG. 1 (and also from other transmitters, including interfering services) and applies them to an input terminal 213 of a mixer 214 of a downconverter 216. Downconverter 216 also includes a local oscillator 218 which is coupled to a second input terminal 215 of mixer 214. Mixer 214 downconverts the received signal to an intermediate frequency (IF) which is applied over a conductor 220 to first input terminals 221 and 223 of mixers 222 and 224, respectively, of a demodulator 226. The purpose of demodulator 226 is to downconvert the spread spectrum intermediate frequency signal on conductor 20 to baseband, or in other words to regenerate the transmitted pseudorandom sequence. Mixer 222 receives at its second input terminal 225 over a conductor 228 a locally generated (local) pseudorandom sequence corresponding to the transmitted pseudorandom sequence. In general, during an acquisition mode of operation (attempting to lock the local PR sequence to the received PR sequence) before receiver 210 is locked to the transmitted signal, the local and received pseudorandom sequences will not be phase coincident, nor will they have the same clock rate and they are therefore not phase coherent. Consequently, the local pseudorandom (PR) sequence applied to input terminal 225 of mixer 222 drifts in phase relative to the received PR sequence, and mixer 222 will therefore produce incoherent noise. At some time, the two sequences will be substantially phase coincident (in-phase). At that time, the output from mixer 222 will be pure IF carrier. The IF carrier produced by mixer 222 is applied by way of a bandpass filter 230 broadly tuned to the IF carrier frequency to the input of a phase lock loop (PLL) 232. Phase lock loop 232 responds to the IF carrier to generate a phase coherent replica of the IF carrier which is applied over a conductor 234 to a second input terminal 227 of mixer 224. Phase lock loop 232 also generates a lock indication signal on a conductor 236 when it becomes phase locked to the intermediate frequency carrier, as described below in relation to FIG. 6. Mixer 224 demodulates the downconverted SS signal by mixing together the downconverted spread spectrum signal received over conductor 220 with the pure carrier received over conductor 234 to generate baseband pseudorandom signal on a conductor 238. The baseband pseudorandom signal is applied to an input terminal of a PRS phase detector 242 of a pseudorandom sequence decoder 240. If the local pseudorandom sequence applied over conductor 228 to mixer 222 is not phase coherent with the received pseudorandom sequence, the local PRS continues to drift in phase relative to the received pseudorandom sequence. The local and received pseudorandom sequences will eventually become noncoincident, mixer 222 will once again generate incoherent noise, and PLL 232 will become unlocked, so that demodulation of the downconverted received signal cannot occur until the next following interval during which the local and received pseudorandom sequences are phase coincident. Demodulation of the received signal by demodulator 226 completes the first of two steps in the acquisition mode.

Pseudorandom sequence decoder 240 receives the demodulated baseband pseudorandom signal on conductor 238 at an input terminal 241 of phase detector 242 and compares it with the local pseudorandom signal applied to an input terminal 243 from a local pseudorandom sequence generator 244. As mentioned, the local and received PRS signals drift in phase relative to each other, but at the time that correctly demodulated PRS signals appear on conductor 238, the local and received PRS sequences are in-phase. Phase detector 242 produces on its output conductor 245 a control signal representative of the relative phase between the local and received pseudorandom sequences. The control signal is processed by a low pass filter 246, which produces filtered control signal on a conductor 248. The filtered control signal on conductor 248 is applied by way of an adder to a voltage controlled oscillator (VCO) 252. Oscillator 252 produces a clock signal, the rate of which is variable in response to the filtered control signal. The rate-variable clock signal is applied to local PRS generator 244 for clocking thereof. As so far described, the arrangement of PRS decoder 240 defines a locked loop designated generally as 254 which phase-locks local PRS generator 244 to the demodulated PRS signal on conductor 238. Locked loop 254 comes into operation as soon as the local pseudorandom sequence drifts into phase coincidence with the received PRS, and thereafter slews in order to maintain phase coincidence between the local and received pseudorandom sequences. Locking of the two PR sequences completes the acquisition sequence. After acquisition, the filtered control signal on conductor 248 includes the desired audio information. An analog signal utilization means illustrated as a block 260 is coupled to low pass filter 246 by way of conductor 248 for receiving the filtered control signal. In a particular use, each of the firemen of a firefighting team might carry a transceiver including a transmitter such as 8 of FIG. 1 and a receiver such as 208 of FIG. 2, both using the same pseudorandom sequence. In such an arrangement, microphone 10 of FIG. 1 might be a helmet-mounted microphone and utilization means 260 of FIG. 2 might include a helmet-mounted amplifier and headphone.

Figure 3:
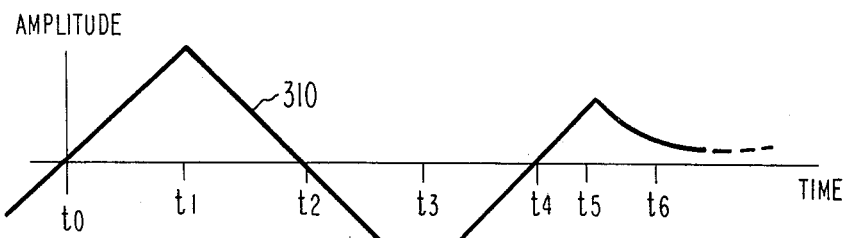
FIG. 3 is an amplitude-time plot of the signals produced by a sweep waveform generator of the arrangement of FIG. 2.

Since the relative clock frequencies and phases of the local and received pseudorandom sequences cannot be determined before reception, a condition could arise in which, during the acquisition mode (before lock up), only a small frequency difference exists between the clock rates of the received and local pseudorandom sequences, and the phase difference is large. With a very small frequency difference and a large phase difference, the phase progression or drift between the local and received pseudorandom sequences towards coincidence will be small, and phase coincidence occurs after a long delay. Since initial lock up of receiver 208 to the received signal depends upon phase coincidence of the local pseudorandom sequence with the received sequence too slow a drift may result in excessive acquisition time. This may be avoided by a sweep waveform generator 270 coupled by a conductor 272 to an input terminal 273 of adder 250. Sweep waveform generator 270 may produce a ramp or triangle waveform such as waveform 310 of FIG. 3 in the time interval between times $T_0$ and $T_4$. During acquisition, the filtered control signal applied from conductor 248 to input terminal 249 of adder 250 has zero magnitude. Consequently, the output of adder 250 is the sweep waveform 310 from generator 270. As described below, generator 270 is controlled by a lock indicator signal applied over conductor 236 to a DISABLE input terminal 275 so as to generate waveform 310 only when the local and received PRS sequences are not phase locked. As soon as lock is achieved, waveform 310 begins to decay towards zero, as illustrated beginning at time $T_5$ in FIG. 3. Sweep waveform generator 270 produces no output signal so long as receiver 208 remains locked, and therefore the output of adder 250 applied to VCO 252 during normal locked operation is the filtered control signal.

Figure 4:
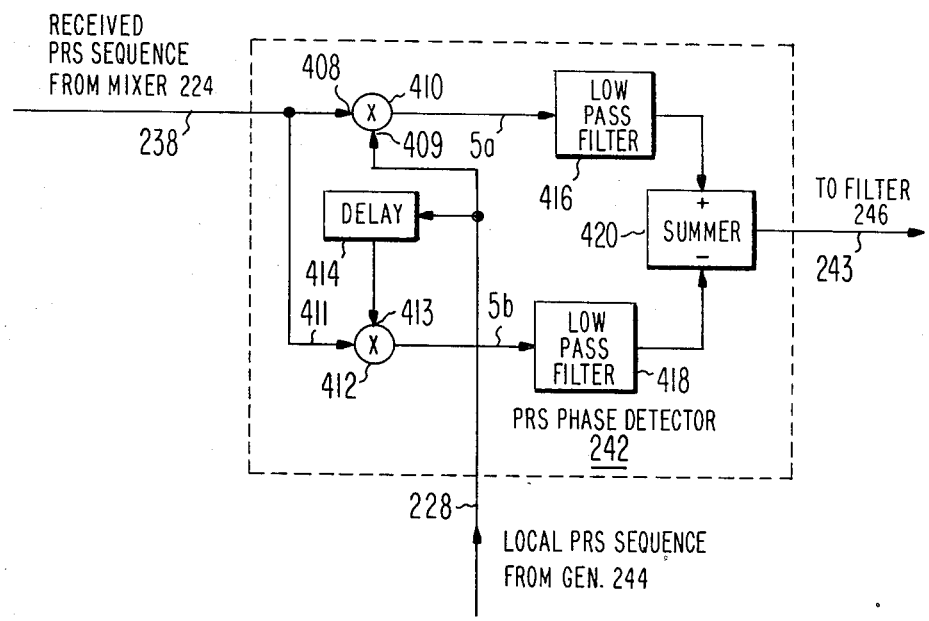
FIG. 4 is a block diagram of a phase detector which may be used in the arrangement of FIG. 1.
Figure 5:
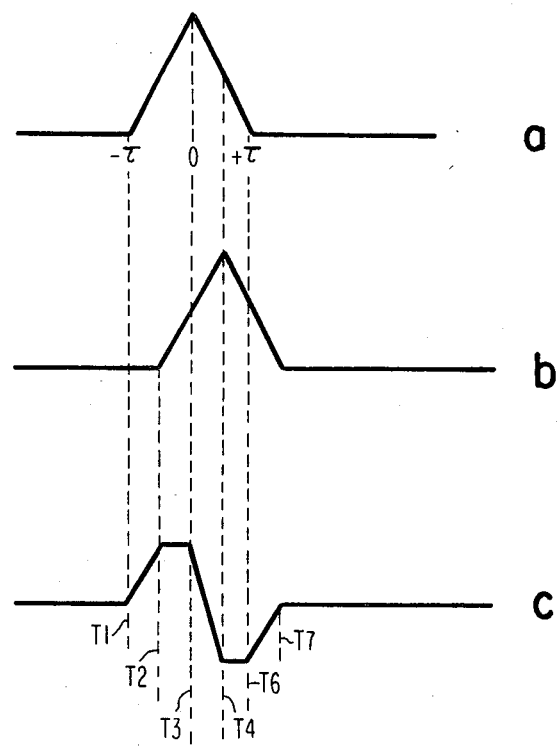
FIGS. 5a–c are plots representing characteristics of various portions of the arrangement in FIG. 3 and an overall characteristic of the phase detector of FIG. 3.

FIG. 4 illustrates details of PRS phase detector 242. In FIG. 4, the received baseband PRS sequence is applied from mixer 224 (not illustrated in FIG. 4) over conductor 238 to first input terminals 408 and 411 of mixers 410 and 412, respectively. The local PRS sequence is applied from generator 244 (not illustrated in FIG. 4) to a second input terminal 409 of mixer 410 by way of a conductor 228, and to a second input terminal 413 of mixer 412 by way of a delay 414. The amplitude characteristic of the signal produced by mixer 410 on output conductor 5a in response to relative timing (phase) differences between the local and received PR sequences is illustrated as 510 of FIG. 5a. As illustrated in FIG. 5a, the amplitude of the output signal is a maximum for timing difference of zero (corresponding to perfect phase coincidence of the local and received PR sequences). The amplitude of the output signal decreases linearly as the time difference approaches ±1 chip interval (±$\tau\tau$). For timing differences greater than one chip interval, the output of mixer 410 is essentially zero. The amplitude response of mixer 412 on conductor 5b to timing differences between the PRS signals at its two inputs is illustrated by 512 of FIG. 5b. Because of delay 414, the local PR sequence applied to input terminal 413 of mixer 412 occurs later than that applied to input terminal 409 of mixer 410 by an amount equal to the delay interval of delay block 414. As illustrated, delay block 414 delays the signal by a time equal to approximately one-half a clock or chip interval, or by a time equal to the difference between time $T_1$ and time $T_2$ in FIG. 5. The output signals from mixers 5a and 5b are applied by way of low pass filters 416 and 418 to the noninverting and inverting inputs, respectively, of a summer or subtractor 420. The characteristic 514 of the signal produced on conductor 243 by summer 420 in response to relative timing or phase differences between the locally generated and received PR sequences is illustrated as 514 of FIG. 5c. As illustrated therein, waveform 514 is the difference between characteristic 510 and characteristic 512. It includes a linear region in the interval $T_3$-$T_4$, corresponding to a one-half clock interval, which is useful for phase control of loop 254. The phase control loop tends to hold the locally generated and received PR sequences in phase coincidence to within a small fraction of a clock interval.

Figure 6:
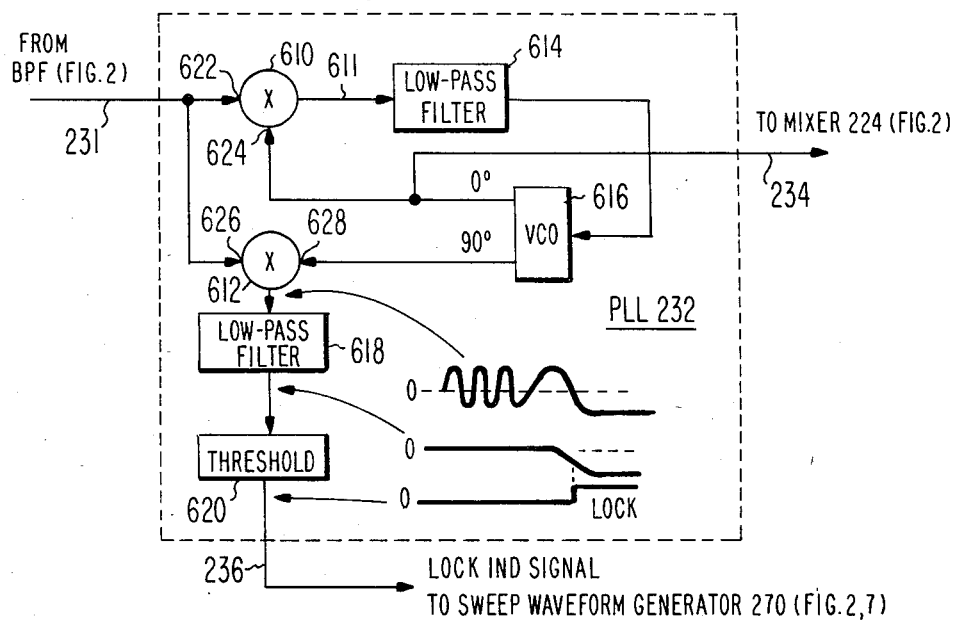
FIG. 6 is a block diagram of a phase-lock loop including a phase lock indicator which may be used in the arrangement of FIG. 2, together with waveforms aiding in understanding its operation.

FIG. 6 illustrates details of PLL 232 of FIG. 2, together with waveforms illustrating the mode of operation at times near lock. In FIG. 6, PLL 232 includes mixers 610 and 612 which receive IF carrier signals from conductor 231 during those intervals when the local and received PR sequences are phase coincident. A voltage controlled oscillator 616 includes two phase coherent outputs, a 0° output and a 90° output. The 0° output of VCO 616 is coupled with mixer 610 and with a low pass filter 614 in a conventional phase lock loop for regenerating the IF carrier and applying the regenerated IF carrier to conductor 234. The 90° phase shifted output of VCO 616 is applied to a second input terminal of mixer 612. When PLL 232 is unlocked, the outputs of VCO 616 are not synchronous with the input signal on conductor 231, and the output of mixer 612 is therefore an alternating-current (AC) signal having no direct current (DC) component. When PLL 232 is locked, the 0° output of VCO 616 is phase coherent with the IF carrier on conductor 231, and the output of mixer 610 on conductor 611 is a minimum. The output of mixer 612, on the other hand, is at a maximum. The output of mixer 612 is applied to a low pass filter 618 which averages the signal in order to eliminate any possibility of a DC output during those times when PLL 232 is unlocked. The output of low-pass filter 618 is applied to a threshold circuit 620 which responds to a DC value occurring when PLL 232 locks to produce a lock indication signal which is applied to conductor 236.

Figure 7:
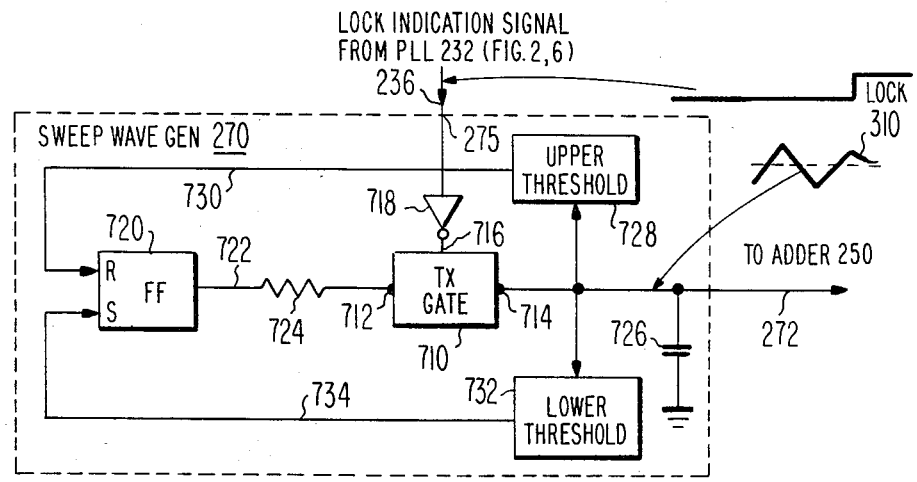
FIG. 7 is a block diagram of a sweep waveform generating arrangement which may be used in the apparatus of FIG. 2 to generate the waveforms of FIG. 3.

FIG. 7 is a block diagram of sweep waveform generator 270 of FIG. 2. In FIG. 7, a transmission (TX) gate 710 controls a conduction path between terminals 712 and 714. When the receiver of FIG. 2 is in the acquisition mode the lock indication signal applied from PLL 232 (FIG. 6) over conductor 236 to DISABLE input terminal 275 of sweep waveform generator 270 is logic zero or LOW. During normal locked operation after acquisition, the lock indication signal is logic one or HIGH. An inverter 718 couples the lock indication signal from conductor 236 and terminal 275 to the ENABLE input terminal 716 of TX gate 710. During the acquisition period, the LOW lock indication signal is inverted to HIGH by inverter 718 and enables TX gate 710. A flip-flop (FF) 720 initially produces either a HIGH or a LOW level signal on a conductor 722 for application to a current limiting resistor 724. During the acquisition intervals in which transmission gate 710 is conductive, current flows through resistor 724 and enabled TX gate 710 in response to the output of FF 720 to charge a capacitor 726 either positive or negative so as to create a substantially ramp-shaped voltage on conductor 272. So long as FF 720 remains in the initial state, capacitor 726 continues to charge through resistor 724 and gate 710. Assuming that FF 720 is initially in the set condition and its output is therefor HIGH or positive, the voltage across capacitor 726 is a positive-going ramp. At some time, the positive-going ramp triggers an upper threshold circuit 728, which may be a Schmidt trigger circuit, which produces a pulse on conductor 730 which is applied to a reset (R) input terminal of FF 720, which resets the FF output to a LOW or negative voltage. With flip-flop 720 in the reset condition, capacitor 726 begins to discharge towards zero volts, producing a negative-going ramp voltage on conductor 272. Eventually, capacitor 726 becomes discharged and begins to charge in the opposite polarity to produce a negative-going ramp voltage. The increasingly more negative voltage across capacitor 726 eventually triggers a lower threshold circuit 732 to produce a pulse on a conductor 734. The pulse on conductor 734 is applied to the set (S) input of FF 720 so as to set the output voltage of FF 720 on conductor 722 HIGH or positive. The high voltage causes capacitor 726 once again to discharge, then charge in a positive polarity. Thus, the voltage on capacitor 726 recurrently ramps between upper and lower threshold voltages to produce a sawtooth or triangle signal which is applied over conductor 272 to adder 250 (FIG. 2). As described above, the sawtooth signal aids in rapid acquisition of phase coincidence of the local and received PR sequences. When lock or phase coincidence of the PRS sequences is achieved, the lock indication signal on conductor 236 goes HIGH, and the control input of transmission gate 710 goes LOW, thereby opening or rendering nonconductive the path between terminals 712 and 714 of transmission gate 710. With the path between resistor 724 and capacitor 726 opened, the voltage on capacitor 726 decays gradually towards zero under the influence of an external load (not illustrated).

Other embodiments of the invention will be obvious to those skilled in the art. While direct-sequence spread-spectrum has been described, clock rate modulation of frequency-hopped spread-spectrum communications use the same principles. If desired, the transmission may be by means of a cable or other conductor, by light signals, underwater acoustic signals, or the like, rather than by broadcast electromagnetic signals as described. In the arrangement of FIG. 2, demodulator 226 may be dispensed with if local oscillator 218 of downconverter 216 can be phase-locked to oscillator 22 of FIG. 1. If the frequency of the transmitted spread-spectrum signal is not too high, downconverter 216 of FIG. 2 may be dispensed with, and demodulator 226 can demodulate the received signal directly to baseband.

What is claimed is:

1. A decoder for a direct-sequence spread spectrum signal encoded with a first pseudorandom sequence the clock rate of which is modulated by analog information, comprising:
   a rate-controllable oscillator for generating variable-rate clock signals;
   a local pseudorandom sequence generator coupled to said rate controlled oscillator for being clocked thereby to produce a local rate-variable pseudorandom sequence, said local pseudorandom sequence corresponding to said first pseudorandom sequence;

phase detecting means including (a) first and second mixing means, each of which includes a first and second input terminals and an output terminal, said first input terminals of said first and second mixing means being coupled together and to receive said spread-spectrum signal, said second input terminal of said first mixing means being coupled to said local pseudorandom sequence generator for receiving said local pseudorandom sequence, (b) delay means coupled between said second input terminal of said first mixing means and second input terminal of said second mixing means for delaying said local pseudorandom signal applied to said second mixing means, (c) first and second lowpass filters coupled to said output terminals of said first and second mixing means, respectively and (d) differencing means coupled to said output terminals of said first and second low pass filters for receiving filtered mixed signals therefrom for generating a control signal equal to the difference between said filtered mixed signals;

loop filter means coupled to said differencing means portion of said phase detecting means for averaging said control signal to generate a filtered control signal;

coupling means coupled to said loop filter means and to said rate-controlled oscillator for closing a degenerative feedback loop for maintaining said first and local pseudorandom sequences in phase coherence, whereby said filtered control signal manifests said analog information; and information utilizing means coupled to said filter means for receiving as said analog information said filtered control signal.

2. A receiver for direct-sequence spread-spectrum signals encoded with a first pseudorandom sequence, the clock rate of which is modulated by analog information and which is upconverted to a carrier frequency, comprising:

first and second mixing means, each including first and second input terminals and an output terminal, said first input terminals of said first and second mixing means being coupled to receive said spread-spectrum signals;

a rate-controllable oscillator for generating variable-rate clock signals;

a local pseudorandom sequence generator coupled to said rate-controllable oscillator for being clocked thereby for producing a variable rate local pseudorandom sequence and also coupled to said second input terminal of said first mixing means for causing said first mixing means to produce said carrier at said output terminal of said first mixing means when said local pseudorandom sequence is in-phase with said first pseudorandom sequence;

first coupling means coupled to said output terminal of said first mixing means and to said second input terminal of said second mixing means for coupling carrier frequency signals to said second mixing means in response to the production of said carrier by said first mixing means, whereby said second mixing means produces at said output terminal of said second mixing means said first pseudorandom sequence downconverted to baseband;

phase detecting means including a first input terminal adapted to receive said first pseudorandom sequence downconverted to baseband and also including a second input terminal coupled to said local pseudorandom sequence generator;

second coupling means coupled to said first input terminal of said phase detecting means and to said output terminal of said second mixing means for coupling to said first input terminal of said phase detecting means said first pseudorandom sequence converted to baseband, whereby said phase detecting means generates an unprocessed control signal representative of the the phase difference between said first and local pseudorandom sequences;

loop filter means coupled to said phase detecting means for filtering said unprocessed control signal to generate a processed control signal;

third coupling means coupled to said loop filter means and to said rate-controllable oscillator for closing a degenerative feedback loop for maintaining said local pseudorandom sequence in-phase with said first pseudorandom sequence whereby said analog information is manifested in said processed control signal; and analog information utilization means coupled to said third coupling means for receiving said processed control signal.

3. A receiver according to claim 2 wherein said first coupling means comprises a bandpass filter for rejecting signals not at the frequency of said carrier and for passing signals at the frequency of said carrier.

4. A receiver according to claim 3 wherein said first coupling means further comprises a phase-lock loop for generating said carrier-frequency signals for application to said second mixing means in response to said carrier filtered by said bandpass filter.

5. A receiver according to claim 2 wherein said first coupling means comprises a phase-lock loop for generating said carrier-frequency signals for application to said second mixing means in response to said carrier produced by said first mixing means.

6. A receiver according to claim 2 wherein said loop filter means comprises a low-pass filter.

7. A receiver according to claim 2 wherein said third coupling means comprises adding means coupled to said loop filter means and to said rate-controllable oscillator for applying said processed control signal from said loop filter means to said rate-controllable oscillator, and further comprising a sweep waveform generator coupled to said adding means for superimposing on said processed control signal a sweep waveform for causing, in an acquisition mode, the rate of said local pseudorandom sequence to change periodically.

8. A receiver according to claim 7 wherein said sweep waveform generator is a ramp waveform generator.

9. A receiver according to claim 7 wherein said first coupling means comprises a phase-lock loop for generating said carrier-frequency signal for application to said second mixing means in response to said carrier produced by said first mixing means during those intervals in which said local pseudorandom sequence is in-phase with said first pseudorandom sequence, said phase-lock loop further generating an out-of-lock signal;

and wherein said sweep waveform generator further comprises an enable input terminal; and further comprising:

fourth coupling means coupled to said enable input terminal of said sweep waveform generator and to said phase-lock loop for coupling said out-of-lock signal to said enable input terminal for enabling said sweep waveform generator when said first and local pseudorandom sequences are not in-phase.

10. A receiver according to claim 9 wherein said sweep waveform generator is a ramp waveform generator.

* * * * *